United States Patent
Birch et al.

(10) Patent No.: US 6,382,227 B1
(45) Date of Patent: May 7, 2002

(54) PRODUCTION OF CONSTANT COMPOSITION GAS MIXTURE STREAMS

(75) Inventors: David W. Birch, Bordon (GB); André Micke, Summit; Shuen-Cheng Hwang, Chester, both of NJ (US); Lesli B. Cosey, West Chicago; Carl W. Schmidt, Downers Grove, both of IL (US); Robert F. Phillips, Newtown; D. Bruce Wilson, Spring City, both of PA (US)

(73) Assignee: The BOC Group, Inc., Murray Hill, NJ (US)

( * ) Notice: Subject to any disclaimer, the term of this patent is extended or adjusted under 35 U.S.C. 154(b) by 486 days.

(21) Appl. No.: 08/853,581

(22) Filed: May 9, 1997

(51) Int. Cl.⁷ ................................................ G05D 11/00
(52) U.S. Cl. ............................................ 137/3; 137/88
(58) Field of Search ........................... 137/93, 88, 3, 137/6

(56) References Cited

U.S. PATENT DOCUMENTS 3,856,033 A * 12/1974 Strain et al. ............... 137/93 X
4,324,294 A * 4/1982 McLoughlin et al. ..... 137/88 X
4,799,511 A * 1/1989 Azimov ....................... 137/613
5,495,875 A 3/1996 Benning et al.
5,674,382 A * 10/1997 Chapman .................... 137/93

FOREIGN PATENT DOCUMENTS

EP  0 463 265 A1  1/1992
EP  0 566 488 A1  10/1993
EP  0 721 921 A1  7/1996

* cited by examiner

Primary Examiner—Kevin Shaver
Assistant Examiner—John Bastianelli
(74) Attorney, Agent, or Firm—Philip H. Von Neida; Salvatore P. Pace

(57) ABSTRACT

Gas mixtures having precise compositions are prepared by separately pumping the components in liquid phase through piping, vaporizing the components, blending the components and analyzing the mixture for composition. A signal sent to a control unit causes any necessary change in the rate of pumping of the liquid components to reduce the difference between the measured concentration and the desired concentration. When the composition is within desired limits it is charged into gas cylinders.

13 Claims, 3 Drawing Sheets

PRODUCTION OF CONSTANT COMPOSITION GAS MIXTURE STREAMS

FIELD OF THE INVENTION

This invention relates to a method of producing flowing gas mixtures having constant compositions over periods of time, and more particularly to a method of providing a gas mixture stream whose component concentrations are continuously adjusted to maintain the ratio of the components of the gas mixture substantially constant over extended periods of time. The invention is especially useful for accurately filling gas cylinders with gas mixtures of desired compositions.

BACKGROUND OF THE INVENTION

Gases that are to be shipped to various locations are generally packaged in portable vessels of various shapes and sizes which are capable of withstanding high pressures and which can be conveniently shipped. Typical of such vessels are the cylindrical containers commonly known as gas cylinders or bottles. These vessels are generally filled with gases by charging the gas into the vessel until the desired pressure is reached. The procedure is relatively simple and problem-free when the gas cylinder is to contain a single gas. However, when a gas container is to be filled to high pressure with a gas mixture, it is more difficult to precisely measure the quantities of all of the components of the gas mixture. Filling gas containers with mixtures is particularly problematic when the mixture is desired at high pressures because gases do not obey the ideal gas laws under such conditions, and, in fact, each gas behaves differently at high pressures.

High pressure containerized binary gas mixtures are generally prepared by charging one component into the container until a selected pressure is reached and then charging the second component into the container until the final pressure is reached. The selected pressure is that which corresponds to the partial pressure of the first component in the desired gas mixture. Unfortunately, because of the non-uniform nature of gases at different pressures, it is difficult or impossible to exactly produce the desired gas mixture.

The problem is further complicated when a container is to be filled with a gas mixture comprising a large concentration of one component, for example concentrations of 75 volume % or more, and small quantities of one or more other components, for example concentrations of 10 volume % or less of each minor component. In such cases the inherent inaccuracy of pressure gauges magnifies the error as the desired concentration of a component decreases. A conventional procedure for filling gas cylinders with gas mixtures comprising a minor component and a major component is to first introduce the minor component into the cylinder using a low pressure gauge, and then introduce the major component into the cylinder to the desired end pressure using a high pressure gauge. Since precision pressure gauge readings are usually accurate to within about 0.1% of full scale, the error will be small when this procedure is used. A disadvantage of this method is that different gauges are required for measuring the components of the gas mixture. Furthermore, if the minor compound is heavier than the major component, the first-filled minor component remains separated at the bottom of the gas cylinder for a prolonged period of time.

Methods and systems for accurately filling vessels with gas mixtures have been considerably investigated. U.S. Pat. No. 3,653,414 discloses a system and method for charging a thermostat with a mixture of a condensable medium and a noncondensable gas. The noncondensable gas is first introduced into the sensor of the thermostat to a predetermined pressure, measured by a first pressure gauge. A quantity of the condensable medium, measured by difference in pressure using a second pressure gauge, is then introduced into the sensor.

U.S. Pat. No. 3,669,134 discloses a gas measuring method in which two gases are charged into separate chambers using separate pressure regulators that are interconnected in such a manner that the pressures of the gases are in a predetermined ratio. The apparatus and method disclosed in this patent is complex and difficult to apply, particularly when it is desired to produce mixtures of three or more gases.

U.S. Pat. Nos. 3,856,033 and 3,948,281 disclose a method of filling gas containers with mixtures of gases by continuously mixing the gases at low pressure and then pressurizing the gas mixture and subjecting the high pressure mixture to infrared analysis to determine the concentration of each component in the gas mixture. If the high pressure mixture does not have the desired composition, adjustments are made in the relative rate of flow of the components to the low pressure mixing zone to reduce the variation from the desired composition.

U.S. Pat. No. 4,219,038 discloses a gas mixing device for mixing a plurality of gases wherein each gas flows through a line that has a pressure regulator. In one embodiment of the disclosed invention the individual gases are stored in batteries of containers.

U.S. Pat. No. 4,688,946 discloses a method of mixing a liquid organic compound and a liquid propellant involving filling a metering cylinder with the liquid organic compound and then forcing the liquid organic compound, together with a predetermined volume of liquid propellant, into a mixing vessel.

U.S. Pat. No. 4,698,160 discloses apparatus for mixing two fluids for use in hemodialysis. Syringe type piston pumps are used to measure and force one or more of the components of the mixture into a mixing vessel.

U.S. Pat. No. 5,353,848 discloses procedure for accurately metering the components of a gas mixture into a gas cylinder while avoiding gas stratification, by introducing the gases into the cylinder in the order of their molecular weights using a differential pressure gauge.

U.S. Pat. No. 5,427,160 discloses a method of charging an oxidant gas and a flammable gas into a storage vessel wherein separate measuring chambers are used for each gas. The residual gas in the system lines is vented from the system.

Because of the importance of providing containerized gas mixtures in which the components of the mixtures are in precise composition, and the need to attain immediate homogeneity of vessel-contained gas mixtures, improved gas vessel filling methods are continuously sought. The present invention provides a method and system which accomplishes these objectives.

SUMMARY OF THE INVENTION

According to one aspect, the invention comprises a method of producing a gas mixture of substantially constant composition. The method comprising: (a) establishing liquid phase flow of each component to be included in the desired mixture; (b) vaporizing the components; (c) mixing the components; (d) analyzing the vaporized mixture to determine the concentration of each component in the mixture; (e) where necessary, adjusting the phase flow rate of one or more of the liquefied components in a manner that will reduce the difference between the measured composition and the desired composition of the gas mixture; and (f) periodically repeating step (e). The components may be first vaporized and then mixed, or they may be first mixed and then vaporized. Flow of the liquid components is established using a variable output pump means. In a preferred embodiment the flow of liquid is established and maintained using variable speed pumps. In another preferred embodiment, the pressure of the flowing components upstream of the point of mixing is controlled by backflow pressure regulating means.

In another preferred embodiment, the concentration of the components is determined using a gas analyzer. The gas analyzer is preferably an infrared gas analyzer or a mass spectrometer. In a more preferred embodiment, the gas analyzer sends a signal to a control system which adjusts the output of one or more of the pump means.

In one preferred version of the invention, the method additionally comprises filling gas containers, preferably gas cylinders with the constant composition gas mixture. In this version the gas mixture stream may be discarded, if its composition is outside acceptable concentration limits, until its composition is brought to within the desired composition range limits by relative adjustment of the liquid flow rates.

In another preferred version, the method additionally comprises using the constant composition gas mixture as a feed gas to a chemical reaction.

In another aspect of the invention, a system for providing flow of gas mixtures of precisely measured components is presented which comprises as major components:
(a) a flow control means for controlling the rate of flow of two or more vaporizable liquids;
(b) liquid vaporizing means;
(c) fluid mixing means;
(d) gas mixture analyzing means; and
(e) flow adjustment control means.

The system also includes a control loop for transmitting a signal from the gas mixture analyzer means to the flow adjustment control means upon determination of the composition of a gas mixture flowing through the system; a control loop for transmitting flow adjustment signals from the flow adjustment control means to the flow control means; conduit means providing fluid communication between each source of vaporizable liquid and the flow control means; conduit means providing fluid communication between the flow control means and one of either the liquid vaporizing means or the fluid mixing means; conduit means providing fluid communication between the liquid vaporizing means and the fluid mixing means; conduit means providing fluid communication between the other of either the liquid vaporizing means or the fluid mixing means and a downstream application; and a sampling device for transmitting to said gas analyzer means samples of fluid passing through the conduiting between the other of either the liquid vaporizing means or the fluid mixing means and the downstream application.

In a preferred embodiment of this aspect of the invention, the downstream application is a gas container filling system.

In one embodiment of the system aspect of the invention, conduit means provides fluid communication between the flow control means and the liquid vaporizing means and conduit means provides fluid communication between the fluid mixing means and the downstream application. In another embodiment of the system conduit means provides fluid communication between the flow control means and the fluid mixing means and conduit means provides fluid communication between the liquid vaporizing means and the downstream application.

In another preferred embodiment of the invention, the gas mixture analyzer is an infrared analyzer or a mass spectrometer. In another preferred embodiment, the flow control means is a variable delivery liquid pumping means.

In a preferred embodiment of the apparatus aspect of the invention, the system further comprises back pressure control means for controlling, at a point upstream of the fluid mixing means, the pressure of fluid flowing in either (a) the conduit means that provides fluid communication between the flow control means and one of the liquid vaporizing means or the fluid mixing means, or (b) the conduit means that provides fluid communication between the liquid vaporizing means and the fluid mixing means.

BRIEF DESCRIPTION OF THE DRAWINGS

The same reference numerals are used to represent the same or similar parts in the various drawings.

DETAILED DESCRIPTION OF THE INVENTION

In the method of the invention the components of the desired mixture are introduced into the system in the liquefied state. The invention takes advantage of the fact that liquids are not compressible. Since the liquefied components are substantially incompressible, the flow rate of the liquid being pumped can be precisely controlled. The flow rates of the liquids remain substantially constant until they are changed, for example by varying the rate of speed of the pumps used to move the liquids through the system. In general, the method of the invention comprises initially causing the various liquid components to move through conduits at selected fixed flow rates estimated to produce a mixture having the desired composition. The liquid phase components are then vaporized and blended to produce a flowing gas mixture of uniform composition. The gas mixture is next analyzed to determine the concentration of each component in the mixture. If the components are present in the gas mixture within an acceptable range of the desired composition, no adjustment of liquefied gas flow rate is necessary. If, however, the gas mixture has a composition that is outside the limits deemed to be acceptable, a signal is sent to one or more of the flow control devices, e.g. pumps, causing the flow control devices to adjust the rate of liquid flow in the direction that will cause the difference between the measured composition and the desired composition to be diminished. Analyses and flow rate adjustments are made as necessary throughout the procedure, so that the composition of the gas mixture will be maintained within a narrow range.

Systems typical of those useful in practice of the invention are illustrated in the appended drawing figures. These figures illustrate systems for mixing three components of a desired gas mixture. The system can also be used to prepare binary gas mixtures, or it can be used to prepare mixtures of gases containing three or more components.

Figure 1:
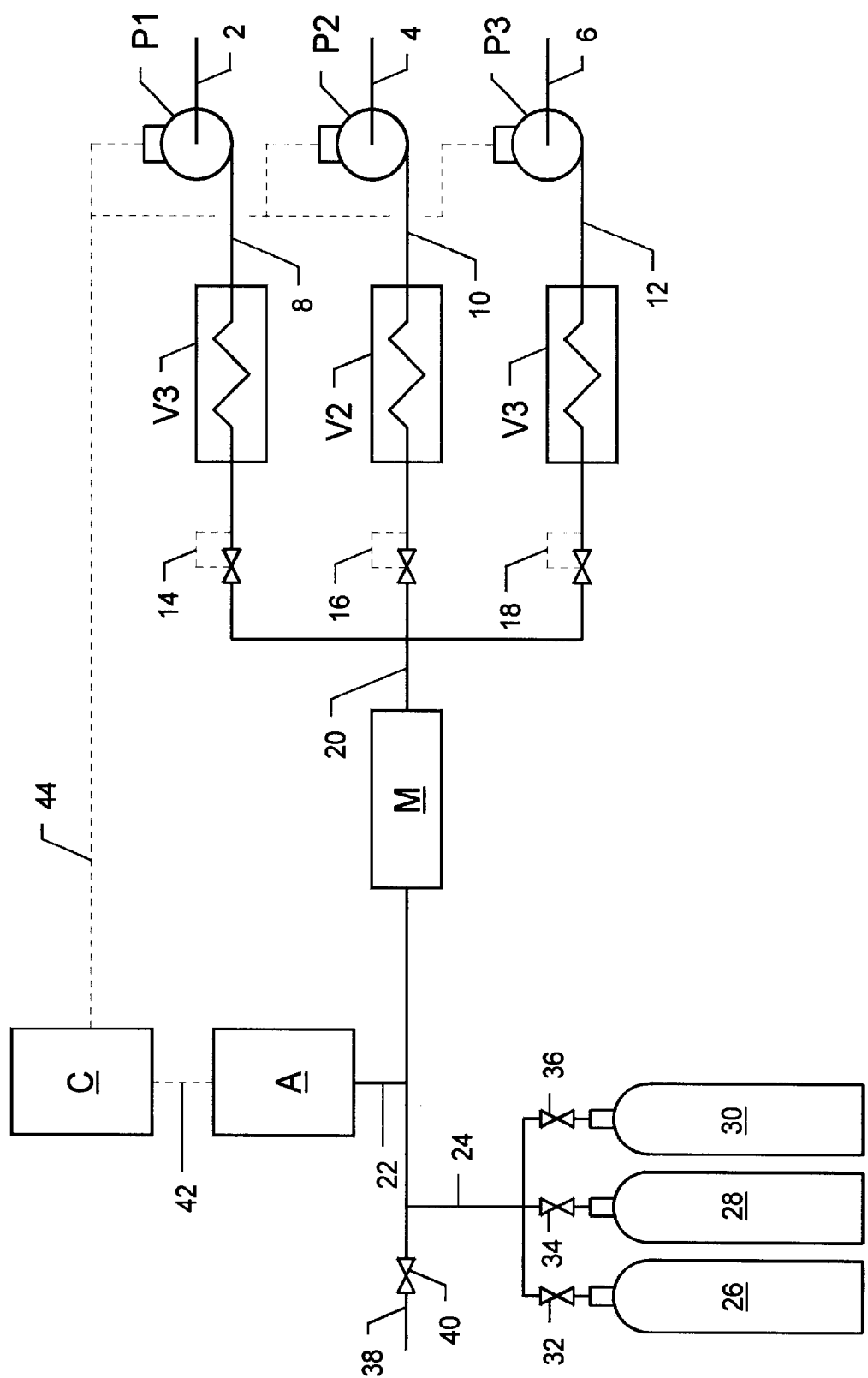
FIG. 1 illustrates one embodiment of the invention in which the individual liquefied gas components are vaporized, then blended and then analyzed.

Considering first FIG. 1, there is illustrated therein a system comprising a battery of variable output pumps, P1, P2, and P3, gas vaporizers V1, V2 and V3, optional gas mixing chamber M, gas analyzer A, flow adjustment control unit C and gas cylinders 26, 28 and 30.

Pumps P1–P3 are any type of liquid transfer pumps whose liquid outputs can be varied. Suitable pumps include variable speed positive displacement pumps and variable displacement positive displacement pumps. The ability to make very small adjustments in the output of the pumps is highly desirable. In a preferred embodiment, a pump is provided for each component of a gas mixture that is being prepared.

Vaporizers V1–V3 are any devices that are useable for vaporizing liquids. They may be ambient temperature vaporizers, or they may be provided with heating means, such as steam heating coils or electric heating coils. In the embodiment illustrated in FIG. 1, a vaporizer is provided for each component to be vaporized. Mixing chamber M may be any gas mixing chamber and it is typically provided with baffling to ensure uniform blending of the gases entering the mixer. As indicated above, mixing chamber M is optional. In some cases the gases may become sufficiently mixed when they are combined into a single conduit, in which case a gas mixing chamber is not necessary. It is important, however, that the gas mixture entering analyzer A be of uniform composition to enable the analyzer to make a meaningful determination.

Analyzer A is any gas analyzer that can measure the concentration of each component of the gas mixture. Suitable gas analyzers include infrared analyzers, mass spectrometers and gas chromatographs. Infrared analyzers and mass spectrometers are preferred since they are capable of rapidly analyzing gases and providing immediately useful information. An infrared gas mixture analyzing system and its operation are described in U.S. Pat. Nos. 3, 856,033 and 3,948,281, mentioned above, the disclosures of which are incorporated herein by reference.

Control unit C is preferably a computer-based control device that can interpret signals received from analyzer A and send a signal to one or more of pumps P1–P3 to adjust the output of the pumps, when desired.

In operation, each of pumps P1–P3 receive liquefied gas through lines 2, 4 and 6, respectively, each of which is connected to a liquefied gas source, typically a storage vessel. The liquids are pumped at predetermined flow rates, which are estimated to provide a gas mixture of the desired composition, when the components are vaporized and blended. The liquid components exit pumps P1, P2 and P3 through pump discharge lines 8, 10 and 12, respectively. The liquids then pass through vaporizers V1, V2 and V3, wherein they are converted to the gas state. Back pressure regulator valves 14, 16 and 18, positioned in lines 8, 10 and 12, respectively, downstream of pumps P1–P3, control the flow of gas through these lines and maintain the back pressure in the lines at the desired value. The gases pass through back pressure regulators 14,16 and 18 and enter line 20, where they begin to mix. The arrangement of the system may be such that the turbulence caused by simply introducing the gas components into line 20 provides sufficient mixing to effect uniform distribution of the gases in the gas mixture. In this case mixing chamber M is not necessary. However, it is often desirable or necessary to pass the gas mixture through a gas blender, such as mixer M, to ensure complete mixing of the gases.

Upon exiting mixing chamber M a sample of the gas mixture taken from line 20 via line 22 is analyzed by analyzer A, which precisely determines the concentration of each component of the gas mixture. If the mixture has the desired composition, it passes through line 24 to a desired end use point. The end use may be, for example, a chemical reactor or, as illustrated in FIG. 1, it may be the filling of gas containers, such as cylinders 26, 28 and 30. These are filled to the desired pressure with the gas mixture by selectively opening valves 32, 34 and 36, respectively. To facilitate gas container filling operations with high pressure gas mixtures, it may be desirable to position a high pressure gas compressor (not shown) in line 24 to raise the pressure of the gas mixture to the desired value.

Upon attaining its analysis, analyzer A sends a signal through control line 42 to control unit C. If the gas mixture does not have the desired composition, unit C sends a signal to one or more of pumps P1–P3 through control loop 44, to cause adjustments to be made to the operating speed of one or more of these pumps, thereby changing the rate of flow of liquid through the pump(s) in a manner that will reduce the difference between the actual composition of the gas mixture and its desired composition. The analysis of the gas mixture can be made as frequently as desired to maintain the composition of the gas mixture within desired limits.

If the gas mixture does not initially meet specifications, it may be discharged from the system through line 38, flow through which is controlled by valve 40. Valves 32, 34, 36 and 40 can be controlled by control means (not shown) which receives a signal from analyzer A. When the gas mixture comes within the acceptable limits valve 40 is closed and one of valves 32, 34 or 36 is opened to commence filling of the cylinders, or the gas mixture may be sent to some other downstream application, as stated above.

Figure 2:
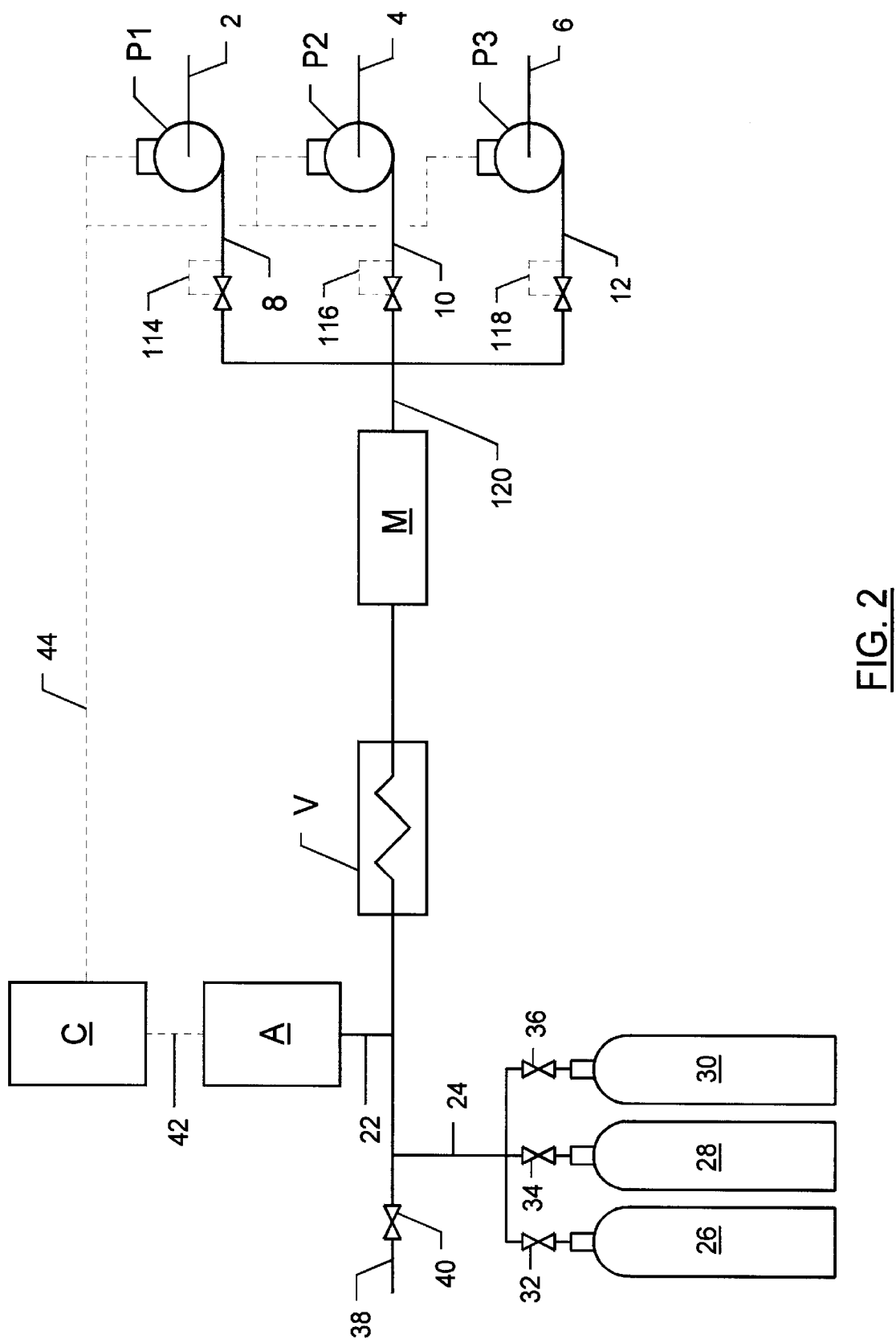
FIG. 2 illustrates a variation of the system illustrated in FIG. 1, in which the liquefied gas components are mixed, then vaporized and then analyzed.

The system of FIG. 2 is a variation of the FIG. 1 system. The FIG. 2 system includes a single vaporizer V which vaporizes the mixed gas stream rather than the individual gas components, as is done in the FIG. 1 system. Also, in the FIG. 2 system back pressure regulators 114, 116 and 118 are located upstream of optional mixing chamber M and vaporizer V. The FIG. 2 system is otherwise identical to that of FIG. 1. As is the case with the FIG. 1 system, mixing chamber M is optional in the FIG. 2 system.

In operation of the FIG. 2 system the liquid components are pumped through back pressure regulators 114, 116 and 118 and begin to mix in line 120. If adequate mixing is attained, mixing chamber M may be omitted from the system. Otherwise it is included. After the liquid components are thoroughly mixed to provide a uniform blend of the liquid components, the mixture is passed through vaporizer V, wherein the mixture is completely vaporized. The resulting gas mixture is then analyzed in analyzer A and processed in the manner described above with respect to operation of the FIG. 1 system. As is the case with the FIG. 1 system, analysis of the gas mixture is made frequently to ensure that the composition of the mixture remains within desired limits. The system of FIG. 1 is preferable to that of FIG. 2 when liquid phase mixing of the components would cause freezing of one of the components. This may be the case, for example, when liquefied carbon dioxide and liquefied argon are mixed. The extremely low temperature of the liquefied argon would cause the liquefied carbon dioxide to freeze and possibly clog up the process lines.

It will be appreciated that it is within the scope of the present invention to utilize conventional equipment to monitor and automatically regulate the flow of gases within the system so that it can be fully automated to run continuously in an efficient manner.

The process of the invention can be used to prepare gas mixtures of any desired composition. The ratios of the component concentrations varies between the capacity extremes of the combination of pumping means employed. Smaller or larger capacity pumps can be used if it is desired to produce gas compositions having component whose concentrations are very small or very large.

The invention is further illustrated by the following example in which, unless otherwise indicated, parts, percentages and ratios are on a molar basis.

EXAMPLE 1

A gas mixture having a composition of 95 mole percent argon and 5 mole percent carbon dioxide is produced using the system of FIG. 1. The components are supplied in the liquefied state at a pressure of 250 bar (gauge) using liquid pumps to pump the argon and carbon dioxide into the system. The liquefied argon pump was maintained at a constant speed throughout the test run, while the liquefied carbon dioxide was periodically adjusted to maintain the carbon dioxide concentration in the gas mixture at about 5 mole percent. The liquefied argon is vaporized using an ambient temperature vaporizer and the liquefied carbon dioxide is vaporized by means of a heated vaporizer at a temperature of 100v F. (37.8° C.) After vaporization, the gas components are mixed using a static mixing unit. A continuous sample stream was continuously analyzed for carbon dioxide concentration using an Siemens infrared analyzer, Model Ultramat® 21/$O_2$ at a point immediately downstream of the mixing unit. The carbon dioxide concentration measurement data was sent to a (Mfr computer, Model No) which compared the measured value with the desired concentration and sent a signal to the liquefied carbon dioxide feed pump at one second intervals to cause adjustments to be made to the speed of the liquefied carbon dioxide feed pump. This analysis and adjustment procedure was continued throughout the duration of the test run.

Figure 3:
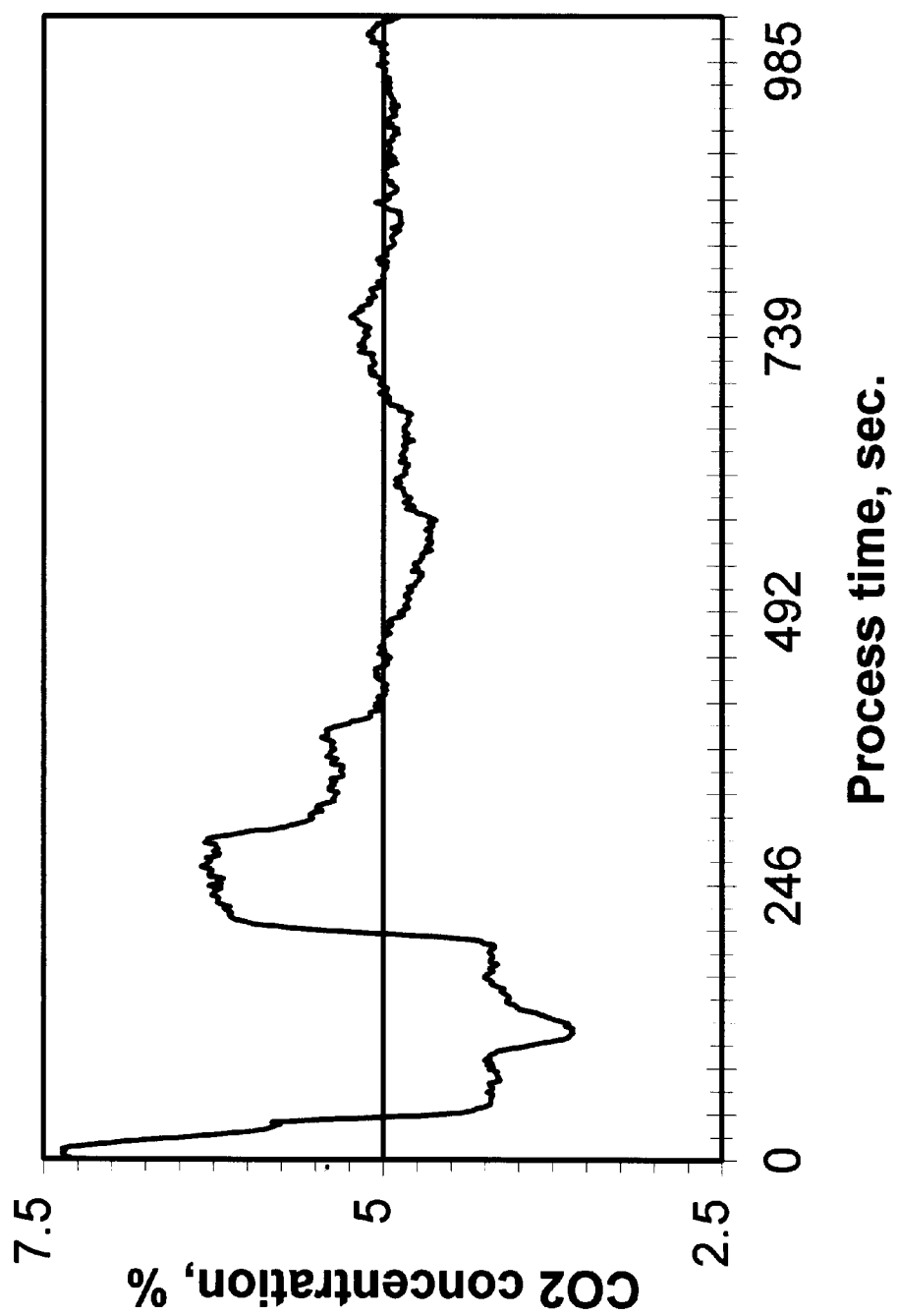
FIG. 3 illustrates a graph of carbon dioxide concentration process time profile.

The results of the experiment are illustrated in graph of FIG. 3, which shows a carbon dioxide concentration-process time profile, with the carbon dioxide concnetration of the gas stream being expressed in mole percent and the process time being expressed in seconds. The FIG. 3 graph shows that during the early part of the blending cycle the carbon dioxide concentration in the gas stream deviated widely from the desired 5% concentration, but the deviation decreased over the course of the test run, and the carbon dioxide concentration became substantially constant after an initial period of about 780 seconds. The initial period can be shortened by decreasing the time interval between samplings.

Although the invention has been described with particular reference to specific equipment arrangements and to specific experiments, these features are merely exemplary of the invention and variations are contemplated. For example, the liquid components may be stored at high pressures. In this case, the storage pressure may be sufficient to propel the gas components through the system, so that it would not be necessary to use pumps to move the liquefied gases. The signal received from control unit C can then be used to adjust flow through lines 8, 10 and 12 by operating flow control valves or variable orifices positioned in these lines. The scope of the invention is limited only by the breadth of the appended claims.

What is claimed is:

1. A method of producing a gas mixture stream of any desired substantially constant composition comprising:
   (a) establishing liquid phase flow of each liquefied gas component to be included in the desired mixture using variable output pump means;
   (b) vaporizing the components;
   (c) mixing the vaporized components;
   (d) measuring the concentration of each component of the vaporized mixture;
   (e) adjusting the liquid phase flow of one or more of said components in a manner that will reduce the difference between the measured composition and the desired composition of the gas mixture; and
   (f) periodically repeating step (d) and step (e).

2. The method of claim 1, wherein the pressure of the flowing components upstream of the point of mixing is controlled by backflow pressure regulating means.

3. The method of claim 1, wherein step (d) is carried out using a gas analyzer.

4. The method of claim 3, wherein said gas analyzer sends a signal to a control system which adjusts the output of one or more of said variable output pump means.

5. The method of claim 4, wherein said gas analyzer is an infrared analyzer or a mass spectrometer.

6. The method of claim 1, further comprising filling one or more gas containers with said gas mixture stream.

7. The method of claim 6, wherein said gas mixture stream is discarded until its composition is substantially the same as said desired composition.

8. The method of claim 1, wherein said gas mixture stream is used as feed to a chemical reaction.

9. A system for providing flow of gas mixtures of precisely measured components comprising:
   (a) variable output pump means for controlling the rate of flow of each of two or more vaporizable liquids;
   (b) liquid vaporizing means;
   (c) gas mixing means;
   (d) gas mixture analyzing means;
   (e) flow adjustment control means;
   (f) control loop means for transmitting a signal from said gas mixture analyzer means to said flow adjustment control means upon determination of the composition of a gas mixture flowing through said system;
   (g) further control loop means for transmitting flow adjustment signals from said flow adjustment control means to said variable output pump means;
   (h) first conduit means providing fluid communication between sources of vaporizable liquids and said variable output pump means;
   (j) second conduit means providing fluid communication between said variable output pump means and the inlet end of said liquid vaporizing means;
   (k) third conduit means providing fluid communication between the outlet end of said liquid vaporizing means and the inlet end of said gas mixing means; and
   (l) fourth conduit means providing fluid communication between the outlet end of said gas mixing means and a downstream application.

10. The system of claim 9, wherein said downstream application is a gas container filling system.

11. The system of claim 9, wherein said gas mixture analyzer is an infrared analyzer or a mass spectrometer.

12. The system of claim 9, further comprising back pressure control means for controlling, at a point upstream of said fluid mixing means, the pressure of fluid flowing in one of (a) said second conduit means, or (b) said third conduit means.

13. The system of claim 9, wherein said variable output pump means comprises at least one variable speed liquid pump.

* * * * *